(12) United States Patent
Wu (10) Patent No.: US 9,432,836 B2
(45) Date of Patent: Aug. 30, 2016

(54) METHOD FOR INFORMATION NOTIFICATION AND METHOD AND ACCESS NODE FOR FORWARDING DATA MESSAGE DURING HANDOVER PROCEDURE

(75) Inventor: Qiang Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1131 days.

(21) Appl. No.: 13/501,762

(22) PCT Filed: Aug. 12, 2010

(86) PCT No.: PCT/CN2010/075938
§ 371 (c)(1),
(2), (4) Date: Apr. 13, 2012

(87) PCT Pub. No.: WO2011/044790
PCT Pub. Date: Apr. 21, 2011

(65) Prior Publication Data
US 2012/0202502 A1 Aug. 9, 2012

(30) Foreign Application Priority Data
Oct. 16, 2009 (CN) .......................... 2009 1 0205557

(51) Int. Cl.
*H04W 36/00* (2009.01)
*H04W 4/00* (2009.01)
(Continued)

(52) U.S. Cl.
CPC .............. *H04W 8/12* (2013.01); *H04L 61/103* (2013.01); *H04L 61/15* (2013.01); *H04L 61/2076* (2013.01);
(Continued)

(58) Field of Classification Search
CPC .................................. H04W 8/04; H04W 8/02
USPC .................................................. 455/436, 433
See application file for complete search history.

(56) References Cited

U.S. PATENT DOCUMENTS 6,988,146 B1 * 1/2006 Magret et al. ................ 709/238
2008/0076453 A1 * 3/2008 Cai et al. ...................... 455/466
(Continued)

FOREIGN PATENT DOCUMENTS

CN 101005444 A 7/2007
CN 101026544 A 8/2007
(Continued)

OTHER PUBLICATIONS

Yan, et al., "A Novel Mobility Management Mechanism Based on an Efficient Locator/ID Separation Scheme", 2009 First International Conference on Future Information Networks, IEEE 2009, 6 pages.
International Search Report dated Dec. 2, 2010 of PCT/CN2010/075938.

*Primary Examiner* — Omoniyi Obayanju
(74) *Attorney, Agent, or Firm* — Banner & Witcoff, Ltd.

(57) ABSTRACT

An information notification method is applied in a network with separated identity identifier and location to notify the correspondent node to update the location identifier of the terminal. The method includes: a terminal establishes a communication with a correspondent node, a first access node which the terminal accesses reports to a home identity location register (ILR) of the terminal the mapping information about the identity identifier and location identifier of the correspondent node of the terminal, and the ILR stores the mapping information about the correspondent node of the terminal; and after having acquired a new location identifier of the terminal, the ILR sends a notification of updating the location identifier of the terminal to one or more access nodes which the correspondent node accesses according to the stored mapping information about the correspondent node of the terminal, carrying the identity identifier and new location identifier of the terminal.

31 Claims, 3 Drawing Sheets

(51) Int. Cl.
*H04W 8/12* (2009.01)
*H04W 36/02* (2009.01)
*H04W 60/00* (2009.01)
*H04L 29/12* (2006.01)
*H04W 80/04* (2009.01)

(52) U.S. Cl.
CPC ....... *H04L 61/2084* (2013.01); *H04W 36/0011* (2013.01); *H04W 36/02* (2013.01); *H04W 60/00* (2013.01); *H04W 80/04* (2013.01)

(56) References Cited

U.S. PATENT DOCUMENTS

2008/0159230 A1* 7/2008 Cho et al. ............... 370/331
2009/0213779 A1* 8/2009 Zhang et al. ............ 370/315

FOREIGN PATENT DOCUMENTS

| | | |
|---|---|---|
| EP | 2071881 A | 8/2009 |
| EP | 2480033 | 7/2012 |
| EP | 2533568 | 12/2012 |

* cited by examiner

METHOD FOR INFORMATION NOTIFICATION AND METHOD AND ACCESS NODE FOR FORWARDING DATA MESSAGE DURING HANDOVER PROCEDURE

TECHNICAL FIELD

The present invention relates to the communication field, and particularly, to an information notification method, a method and an access node (abbreviated as AN) for forwarding data message during a handover.

BACKGROUND OF THE RELATED ART

The IP address in the exiting transmission control protocol/Internet protocol (TCP/IP) widely used in the Internet has dual functions, not only being used as the location identifier of a communication terminal host network interface of the network layer in the network topological structure but also used as the identity identifier of the host network interface of the transport layer. Initially, the design of TCP/IP did not take the situation that the host moves into account. However, when the host movement becomes more and more universal, such overload defect of semantics of IP address is becoming more and more apparent. When the IP address of the host changed, not only the routes will change, but also the identity identifier of the communication terminal host will change, which will cause the route load heavier and heavier, furthermore, the change of the host identifier will cause the application and connection to be interrupted. The object of the proposition of separated identity identifier and location is to solve problems such as semantic overload of IP address and severe route load and so on, the dual functions of the IP address are separated to support mobility, multi-homing, dynamic reallocation of IP address, reducing route load and visit among different network areas in the next generation network, and so on.

In the related art, the implementation method based on network routers is one of the solutions regarding separated identity identifier and location. In the related art, an implementation method for a mobile handover management based on a network router solution is proposed, in which the specified steps of an AN notifying the access nodes which the correspondent nodes (abbreviated as CN) of all the mobile terminals of the new mapping information about the mobile node (abbreviated as MN) are proposed.

During the handover procedure in the related art, a correspondent node list is stored for each user terminal which accesses locally at the access node, as shown in the following Table 1, the correspondent node list includes the identity identifier and location identifier of this user terminal and the information about all correspondent nodes of this user terminal

TABLE 1

Correspondent node list stored by access node for user terminal which accesses locally

| Identity identifier | Location identifier | Correspondent node 1 | . . . | Correspondent node N |
|---|---|---|---|---|

During a particular implementation, the access node also needs to store the mapping and routing information about all the correspondent nodes of the user terminals which access locally (such as the identity identifier and location identifier of the correspondent node), also, the access node is required to notify the access node which the correspondent node accesses alone or with the assistance of an identity location register. If the identity location register cannot provide the help of forwarding a notification, then the access node has to store the information about the access node which the correspondent node accesses.

The above embodiments mainly have the following problems:

1. There are lots of service applications in the existing network, such as a peer-to-peer (P2P) network and so on, each MN would have dozens or even hundreds of CNs, and it takes a large amount of memory resources and CPU processing performance of the access node to store and maintain this correspondent node list; and 2. During a handover, the access node at the handover-out side needs to transfer this correspondent node list to the access node at the handover-in side, and the access node at the handover-in side notifies the access node which the CN accesses of the new mapping information about the MN according to the information about the CN in the correspondent node list. It takes a large amount of communication signaling to transfer this correspondent node list between the handover-out and handover-in access nodes. Furthermore, the access node at the handover-in side will notify the access node which the correspondent node CN accesses of the new mapping information one by one, and it also takes a large amount of communication signaling. This will occupy a great deal of signaling processing ability of the access node, especially when the handover-in users are relatively centralized during a certain time period, and the signaling to be processed by the access node at the handover-in side will increase dramatically, causing the signaling processing load too heavy; moreover, such burst signaling processing load will make it difficult to plan the network of the access node.

SUMMARY OF THE INVENTION

A technical problem to be solved by the present invention is to provide an information reporting method, so as to solve the problem that the correspondent node list in the access node is too large.

In order to solve the above problem, the present invention provides an information notification method, applied in a network with separated identity identifier and location, to notify a correspondent node to update the location identifier of a terminal, the method comprising:

the terminal establishes communication with the correspondent node, wherein a first access node which the terminal accesses reports to a home identity location register (ILR) of the terminal the mapping information about the identity identifier and location identifier of the correspondent node of the terminal, with the ILR storing the mapping information about the correspondent node of the terminal; and after having acquired a new location identifier of the terminal, the ILR sends a notification of updating the location identifier of the terminal to one or more access nodes which the correspondent node accesses according to the stored mapping information about the correspondent node of the terminal, carrying the identity identifier and a new location identifier of the terminal.

The ILR acquires a new location identifier of the terminal according to the following manners: the terminal hands over from the first access node to a second access node, the second access node notifies the ILR to update the location identifier of the terminal after having allocated a new location identifier to the terminal, carrying the new location identifier of the terminal; and after having received the notification of updating the location identifier of the terminal from the second access node, the ILR acquires the new location identifier of the terminal.

The ILR acquires a new location identifier of the terminal according to the following manners: the terminal hands over from the first access node to a second access node, the second access node notifies the first access node after having allocated a new location identifier to the terminal; and After having received the new location identifier of the terminal, the first access node notifies the ILR to update the location identifier of the terminal, carrying the new location identifier of the terminal; and after having received the notification from the first access node, the ILR acquires the new location identifier of the terminal.

The method further comprises: after having learnt that the mapping information about the correspondent node of the terminal has changed, the first access node reports the changed mapping information to the ILR in real time; or the first access node reports the changed mapping information about the correspondent node of the terminal to the ILR regularly; or after the number of the correspondent nodes of the terminal reaches a predetermined number, the first access node reports the mapping information about the correspondent node of the terminal to the ILR, then reports the changed mapping information about the correspondent node of the terminal in real time or regularly.

The method further comprises: after having received a handover request sent from the current access network of the terminal, the first access node initiates the handover, if there is still mapping information not reported to the ILR in the mapping information about the correspondent node of the terminal locally stored by the first access node, then the mapping information not reported to the ILR will be reported to the ILR, and the ILR stores the received mapping information.

After the first access node starts the handover and completes the reporting of the mapping information not reported, the method further comprises: if there is an update in the locally stored mapping information about the correspondent node of the terminal, the updated mapping information about the correspondent node of the terminal is reported to the ILR in real time, and the ILR updates the stored mapping information about the correspondent node; and, if the ILR has sent the notification of updating the location identifier of the terminal to the access node which the updated correspondent node accessed before, then it sends a notification of updating the location identifier of the terminal to the access node which that correspondent node newly accesses again.

The first access node learns that there is an update in the mapping information about the correspondent node of the terminal according to the received notification of updating the mapping information about the correspondent node sent by the home ILR of the correspondent node, and the notification of updating the mapping information about the correspondent node carries the identity identifier of the terminal and the mapping information of the correspondent node; and the method further comprises: after having deleted the locally reported communication relationship information about the terminal and the correspondent node, the first access node reports the updated mapping information about the correspondent node of the terminal to the ILR according to the identity identifier of the terminal in the notification of updating the mapping information about the correspondent node.

The present invention also provides an information reporting method, applied in a network with separated identity identifier and location, the method comprising:

a terminal establishes a communication with a correspondent node via an access node which each of them accesses, the access node which the terminal accesses reports the communication relationship information about the terminal and the correspondent node and the mapping information about the identity identifier and location identifier of the correspondent node to a home ILR of the terminal;

the home ILR of the terminal stores the received communication relationship information and mapping information and returns a success response; and after the terminal has received the success response, the access node which the terminal accesses deletes the reported communication relationship information about the terminal and the correspondent node.

The method further comprises: after having learnt that the mapping information about the correspondent node of the terminal has changed, the access node which the terminal accesses reports the changed mapping information to the ILR in real time; or the access node which the terminal accesses reports the changed mapping information about the correspondent node of the terminal to the ILR regularly; or after the number of the correspondent nodes of the terminal reaches a predetermined number, the access node which the terminal accesses reports the mapping information about the correspondent node of the terminal to the ILR, then reports the changed mapping information about the correspondent node of the terminal in real time or regularly.

The present invention also provides a handover method, applied in a network with separated identity identifier and location, comprising:

a terminal establishes a communication with a correspondent node, wherein a first access node which the terminal accesses reports to a home identity location register (ILR) of the terminal the mapping information about the identity identifier and location identifier of the correspondent node of the terminal, and the ILR stores the mapping information about the correspondent node of the terminal;

after having received a handover request sent from the current access network of the terminal, the first access node starts the handover and initiates a handover request toward a second access node, if there is still mapping information not reported to the ILR in the mapping information about the correspondent node of the terminal locally stored by the first access node, then the mapping information not reported to the ILR will be reported to the ILR, and the ILR stores the received mapping information; and after having received the handover request, the second access node allocates a new location identifier to the terminal and notifies the ILR to update the location identifier of the terminal, carrying the new location identifier of the terminal; and after having received the notification of the second access node, the ILR acquires the new location identifier of the terminal.

After the ILR has acquired the new location identifier of the terminal, the method further comprises: the ILR sends a notification of updating the location identifier of the terminal to one or more access nodes which the correspondent node accesses according to the stored mapping information about the correspondent node of the terminal, carrying the identity identifier and new location identifier of the terminal;

after having received a success response returned by the access node which the correspondent node accesses, the ILR notifies the second access node that the update of the correspondent node is completed; and after having received the notification of the ILR, the second access node sends handover complete message to the first access node after having determined to establish a connection with the handover-in terminal and acquired the mapping information about the correspondent node of the terminal.

The present invention also provides a method for forwarding data message during a handover, applied in a network with separated identity identifier and location, comprising:

a terminal establishes a communication with a correspondent node, wherein an access node which the terminal accesses reports to a home ILR of the terminal the mapping information about the identity identifier and location identifier of the correspondent node of the terminal, and the ILR stores the mapping information about the correspondent node of the terminal;

after having updated the mapping information about the terminal, the ILR sends a notification of updating the mapping information about the terminal to one or more access nodes which the correspondent node accesses according to the stored mapping information about the correspondent node of the terminal, carrying the updated mapping information about the terminal; and after having received the updated mapping information about the terminal, the access node which the correspondent node accesses, when receiving data message sent from the correspondent node to the terminal, sends the data message to a second access node at the handover-in side of the terminal according to the updated location identifier of the terminal.

The ILR updates the mapping information about the terminal according to the following manners: the terminal hands over from a first access node to a second access node, the second access node notifies the ILR to update the location identifier of the terminal after having allocated a new location identifier to the terminal, carrying the new location identifier of the terminal; and after having received the notification of updating the location identifier of the terminal from the second access node, the ILR updates the stored mapping information about the terminal according to the new location identifier of the terminal.

The ILR updates the mapping information about the terminal according to the following manners: the terminal hands over from the first access node to a second access node, the second access node notifies the first access node after having allocated a new location identifier to the terminal; and after having received the new location identifier of the terminal, the first access node notifies the ILR to update the location identifier of the terminal, carrying the new location identifier of the terminal; and the ILR updates the stored mapping information about the terminal according to the new location identifier of the terminal.

The first access node at the handover-out side of the terminal establishes a forwarding relationship with the second access node during a handover;

before the access node which the correspondent node accesses receives the updated mapping information about the terminal, the method further comprises:

when receiving data message sent from the correspondent node to the terminal, sending the data message to the first access node according to the locally stored original location identifier of the terminal; and after having received the data message, the first access node forwards the data message to the second access node according to the established forwarding relationship.

After having received a handover response of the second access node, the first access node establishes the forwarding relationship with the second access node; and the method further comprises: after having sent handover complete message to the first access node and received the data message forwarded by the first access node, the second access node deletes the forwarding relationship.

After the first access node has received the data message sent to the terminal, the method further comprises:

the first access node forwards the received data message to the second access node according to the established forwarding relationship in real time; or after having buffered the data message sent to the terminal and received the handover complete message, the first access node sends the buffered data message to the second access node and deletes the forwarding relationship after having forwarded the buffered data message.

The present invention also provides a method for forwarding data message during a handover, applied in a network with separated identity identifier and location, comprising:

a terminal establishes an end-to-end communication with a correspondent node via an access node which each of them accesses, and the access node stores the mapping information about the identity identifier and location identifier of the correspondent node;

the terminal carries out a handover, a second access node at the handover-in side allocates a new location identifier to the terminal and establishes a forwarding relationship with a first access node at the handover-out side of the terminal during the handover;

before learning the new location identifier of the terminal, the access node which the correspondent node accesses, when receiving data message sent from the correspondent node to the terminal, sends the data message to the first access node according to the locally stored original location identifier of the terminal; and after having received the data message, the first access node forwards the data message to the second access node according to the established forwarding relationship.

After having received a handover response of the second access node, the first access node establishes the forwarding relationship with the second access node; and the method further comprises: after having sent handover complete message to the first access node and received the data message forwarded by the first access node, the second access node deletes the forwarding relationship.

The step of after having received the data message sent to the terminal, the first access node forwarding the data message to the second access node according to the established forwarding relationship comprises:

forwarding the data message to the second access node in real time; or after having buffered the data message sent to the terminal and received the handover complete message, sending the buffered data message to the second access node and deleting the forwarding relationship after having forwarded the buffered data message.

The present invention also provides an access node, applied in a network with separated identity identifier and location, comprising a terminal information reporting unit and a correspondent node information reporting unit, wherein the terminal information reporting unit is configured to: when a terminal accesses, allocate a new location identifier to the terminal and report the identity identifier and the new location identifier of the terminal to a home ILR of the terminal; and the correspondent node information reporting unit is configured to: when the terminal establishes a communication with a correspondent node, report the communication relationship information about the terminal and the correspondent node and the mapping information about the identity identifier and location identifier of the terminal to the home ILR of the terminal.

The correspondent node information reporting unit is further configured to: after having learnt that the mapping information about the correspondent node of the terminal has changed, report the changed mapping information to the ILR in real time; or report the changed mapping information about the correspondent node of the terminal to the ILR regularly; or after the number of the correspondent nodes of the terminal reaches a predetermined number, report the mapping information about the correspondent node of the terminal to the ILR, then report the changed mapping information about the correspondent node of the terminal in real time or regularly.

The correspondent node information reporting unit is configured to: delete the reported communication relationship information about the terminal and the correspondent node.

The correspondent node information reporting unit is further configured to: when the terminal carries out the handover, if there is still mapping information not reported to the ILR in the mapping information about the correspondent node of the terminal locally stored by the access node, then report the unreported mapping information to the ILR.

The present invention also provides an identity location register, applied in a network with separated identity identifier and location, comprising an information storage unit and a location identifier update unit, wherein the information storage unit is configured to: receive the mapping information about the identity identifier and location identifier of the correspondent node of the terminal reported by the access node and the mapping information about the correspondent node of the terminal, store the information locally; and the location identifier update unit is configured to: after having acquired the new location identifier of the terminal, update the location identifier in the locally stored mapping information about the terminal The location identifier update unit is further configured to: after having acquired a new location identifier of the terminal, send a notification of updating the location identifier of the terminal to one or more access nodes which the correspondent node accesses according to the locally stored mapping information about the correspondent node of the terminal, carrying the identity identifier and the new location identifier of the terminal.

The location identifier update unit is configured to: acquire the new location identifier of the terminal according to the following manner: after having received the notification of the second access node, acquire the new location identifier of the terminal; and the notification of the second access node is that the terminal hands over from the first access node to a second access node, and after having allocated a new location identifier to the terminal, the second access node sends the notification to the location identifier update unit, carrying the new location identifier of the terminal The location identifier update unit is configured to: acquire the new location identifier of the terminal according to the following manner: after having received the notification of the first access node, acquire the new location identifier of the terminal;

the notification of the first access node is that the terminal hands over from the first access node to a second access node, and after having allocated a new location identifier to the terminal, the second access node notifies the first access node; and after having received the new location identifier of the terminal, the first access node sends the notification to the location identifier update unit, carrying the new location identifier of the terminal.

The present invention also provides an access node, applied in a network with separated identity identifier and location, comprising a mapping information update unit and a forwarding unit, wherein the mapping information update unit is configured to: after having received the notification of updating the location identifier of the correspondent node or updating the mapping information about the correspondent node, update the location identifier in the locally stored mapping information about the identity identifier and location identifier of the correspondent node; and the forwarding unit is configured to: when receiving data message sent from the correspondent node to the terminal, forward the data message to the access node which the correspondent node accesses according to the locally stored mapping information about the correspondent node.

The present invention also provides an access node, applied in a network with separated identity identifier and location, comprising a forwarding relationship unit and a data forwarding unit, wherein the forwarding relationship unit is configured to: after having sent a handover response to a source access node where a terminal hands over out or having received the handover response sent by a target access node at the handover-in side of the terminal, establish a forwarding relationship with the source access node or the target access node; and the data forwarding unit is configured to: after having received data message sent from the correspondent node to the terminal during a handover, forward the data message to the target access node via the forwarding relationship; or, after having received data message forwarded by the source access node of the terminal, forward the data message to the terminal.

The data forwarding unit is configured to: after having received data message sent from the correspondent node to the terminal, forward the data message to the target access node in real time; or, buffer the received data message sent from the correspondent node to the terminal, and after having received handover complete message sent from the target access node, send the buffered data message to the target access node according to the established forwarding relationship.

The forwarding relationship unit is further configured to: after having sent handover complete message to the source access node and received the data message forwarded by the source access node, delete the forwarding relationship; or, after having received handover complete message sent from the target access node and forwarded the received data message sent from the correspondent node to the terminal, delete the forwarding relationship.

As compared to the related art, the above embodiments at least have the following beneficial effects:

1. a simplified handover management procedure is proposed in combination with the features of the mobile communication network, an optimized method for managing user data in the handover management process is proposed, the function distribution and main procedure of various function entities during the handover management process are clarified, and mobility handover management is achieved under the framework based on separated identity identifier and location of the network; and 2. the signaling processing load of the access node is effectively reduced during a handover, which makes the function distribution of various network elements during the handover more rational.

PREFERRED EMBODIMENTS OF THE PRESENT INVENTION

Hereinafter, the present invention will be described in detail in conjunction with the accompanying drawings and embodiments.

The proposition of the framework based on separated identity identifier and location of the network is to separate the dual functions of the IP address for identifying identity and location, support problems such as mobility, multi-homing, dynamic reallocation of IP address, reducing route load and visit among different network areas in the next generation network, and so on.

The core concept of the framework (also referred to as the present architecture) based on separated identity identifier and location of the network is as follows: there are two kinds of identifiers in the present architecture: an identity identifier (access identifier, abbreviated as AID) and a location identifier (routing-location identifier, abbreviated as RID). Among them, AID is the unique identity identifier allocated to each user terminal in the network, used in the access layer, and keeps unchanged during the movement of the user terminal; and AID is used among the user terminals inside the present architecture network to identify the correspondent nodes, and the AIDs of the correspondent nodes are used for the communication among user terminals.

Figure 1:
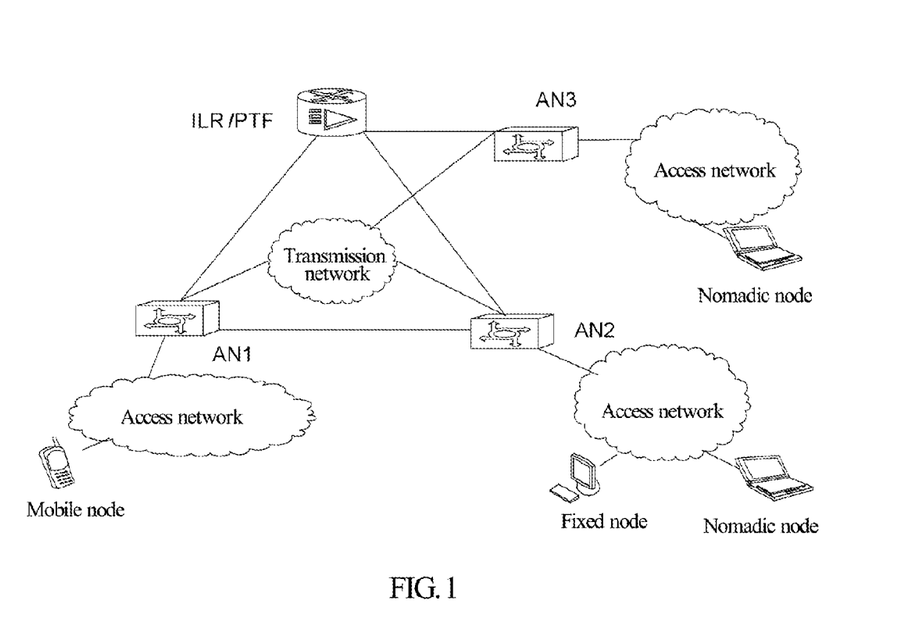
FIG. 1 is a schematic diagram of the network topology based on separated identity identifier and location of the network according to the embodiments of the present invention.

FIG. 1 shows the main network elements relevant to a handover in the network topology based on separated identity identifier and location, including access networks, ANs, an identity location register (abbreviated as ILR), a transmission network, etc., and other parts outside the access network are all viewed as component parts of the backbone network. In this case, the access network is used for providing 2-layer (physical layer and link layer) access service to the user terminal. The access network can a base station system, such as base station subsystem (BSS), a radio access network (RAN), an evolved node B (eNodeB), etc., and can also be a digital subscriber line (xDSL), a radio access point (AP), etc.

AN is a boundary node between the access network and the backbone network for maintaining the connection relationship between the terminal and the backbone network, allocating an RID to the terminal (it can be routed to this AN according to this RID), processing the handover procedure, processing the registration procedure, maintaining/querying the AID-RID mapping information about the correspondent node, encapsulating, routing and forwarding data message sent to or from the user terminal.

The identity location register is used for registering the user terminal, storing and maintaining the AID-RID mapping information about the user terminal, and processing the location query of the user terminal.

The transmission network is used for routing and forwarding the data message with the source address and destination address thereof being in the format of RID among user terminals which accesses via the access network. This transmission network can be a packet data network.

The user terminal of this network can be one or more of a mobile node, a fixed node, and a nomadic node. All the communications among the user terminals are forwarded and managed by the AN of the access network where it is located. When the user terminal starts up or the location thereof changes, a registration process will be initiated toward the home ILR via the AN which it accesses, so that the home ILR stores the real-time AID-RID mapping information about the user terminal. AN can query the RID of the correspondent node toward the ILR via a signaling. Within the same AN, the data message among user terminals is directly forwarded to the correspondent node. When data message is forwarded among user terminals within different ANs, an AN, when forwarding the data message sent by a terminal which accesses the present AN, encapsulates the RID information about this terminal and correspondent node and routes and forwards the same via the transmission network; and when receiving data message sent to the terminal which accesses the present AN, peels the RID information and then forwards the data message to this terminal.

It needs to note that in a particular network based on architecture with separated identity identifier and location, the above network elements may have different names, for example, the access node can also be referred to as an access server or an access switch router, identity location register can also be referred to as a mapping server, a subscriber home register, a subscriber home server, etc. The above network elements can correspond to one network element and can also be a combination of a plurality of network elements, for example, the access node includes the function of ETR and ITR in the LISP network. The above network elements shall be identified based on their functions.

Hereinafter, the processing of a user terminal initiating a communication toward a correspondent node under the above network architecture will be described. Taking a mobile node (MN) as an example, when an MN actively initiate a communication towards a CN, the AN1 which the MN accesses queries the location of the CN and receives and sends data message, and its process is particularly as follows (not shown in the figure):

after having received data message sent by the MN, the AN1 queries the corresponding RID locally according to the AID of the CN in the data message:

if the AN1 finds the corresponding RID information locally, then the RIDs of the MN and CN will be encapsulated in the data message and routed to the AN3 which the CN accesses via the transmission network;

if the AN1 does not find the AID-RID mapping information about CN locally, then it initiates a query procedure toward ILR so as to acquire the AID-RID mapping information about CN, and the processing of the data message can be as follows: the data message is sent to the packet transfer function (PTF), forwarded by the PTF to the AN3, and can also be buffered first, and after the RID of the CN is found, the RIDs of the MN and CN are encapsulated into the data message and then routed to the AN3 via the transmission network.

When receiving the data message with the destination thereof being the CN forwarded by the transmission network, AN3 which CN accesses carries out de-encapsulation processing, peels the RID therein, then sends the data message to the CN.

Figure 2:
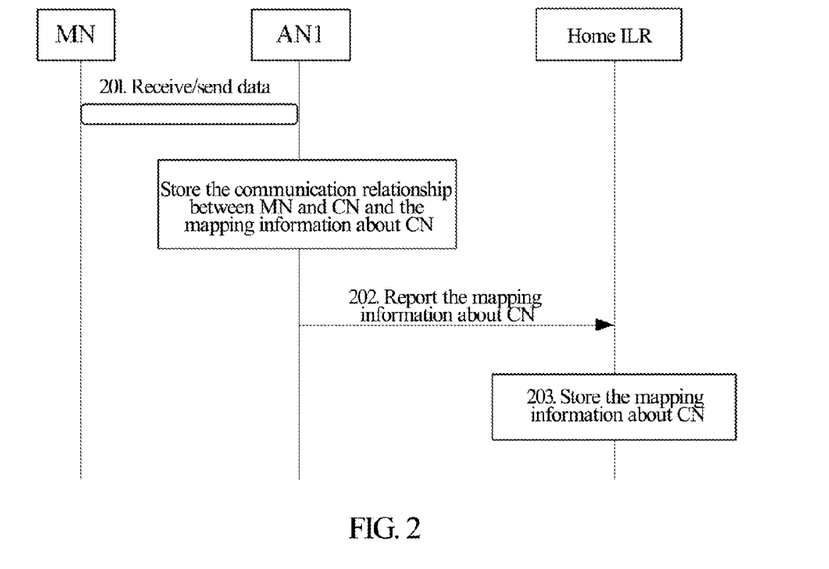
FIG. 2 is a schematic diagram of the flow of reporting correspondent node information according to the embodiments of the present invention.

In order to solve the problem that the correspondent node list in the AN occupies memory, this embodiment provides a method for reporting correspondent node information, as shown in FIG. 2, it mainly includes the following steps:

Step 201: the MN and CN establish a communication, and during the process of transmitting and receiving the data, AN1 stores the communication relationship information about the MN and the correspondent node and the AID-RID mapping information about the correspondent node;

during the communication between MN and CN, the communication relationship information about the MN and the correspondent node can be stored in a correspondent node list, in which the AIDs of all the correspondent nodes are recorded; and the AID-RID mapping information about the correspondent node can be stored in a mapping and routing list, in which the AID-RID mapping information about the correspondent nodes of all the MNs which access the AN can be stored.

Step 202: AN1 reports the AID-RID mapping information about the correspondent node of the MN to the home ILR of MN;

AN1 can initiate a procedure of reporting the correspondent node information toward the home ILR of the MN by reporting the message of correspondent node information alone, which includes the AID-RID mapping information about the correspondent node of the MN.

When the mapping information about a certain CN of the MN changes (for example, a handover occurs), AN1 needs to notify the home ILR to update the mapping information about this CN; and when the communication relationship between the MN and a certain CN is disconnected, AN1 notifies the home ILR to delete the mapping information about the relevant CN. AN1 can report the mapping information about the CN to the home ILR of the MN according to a certain strategy, i.e. it is to report as soon as there is a change; or AN1 can also report the mapping information about the CN to the home ILR in batch, for example, every certain time period, or when the number of CNs reaches a predetermined number, the mapping information about the correspondent node will be reported to the home ILR. When the number of CNs reaches a predetermined number, after having reported the mapping information about the correspondent node to the home ILR, the mapping information about the changed CN will be reported in real time or regularly.

Step 203: the home ILR stores the received AID-RID mapping information about the correspondent node of the MN and returns a response to the AN1.

After having received a success response from the home ILR, AN1 can select to delete the reported information about CN in the correspondent node list of the MN according to a set strategy, such as the AID of the CN. However, if the set strategy is to employ the manner of real-time reporting, then there is no need for AN1 to store the correspondent node list, thus greatly solving the problem that the correspondent node list in the AN1 is too large and thus occupies memory and processing performance.

Hereinafter, the method for achieving handover management under the above network architecture will be further described in detail in conjunction with the accompanying drawings and particular embodiments.

Figure 3:
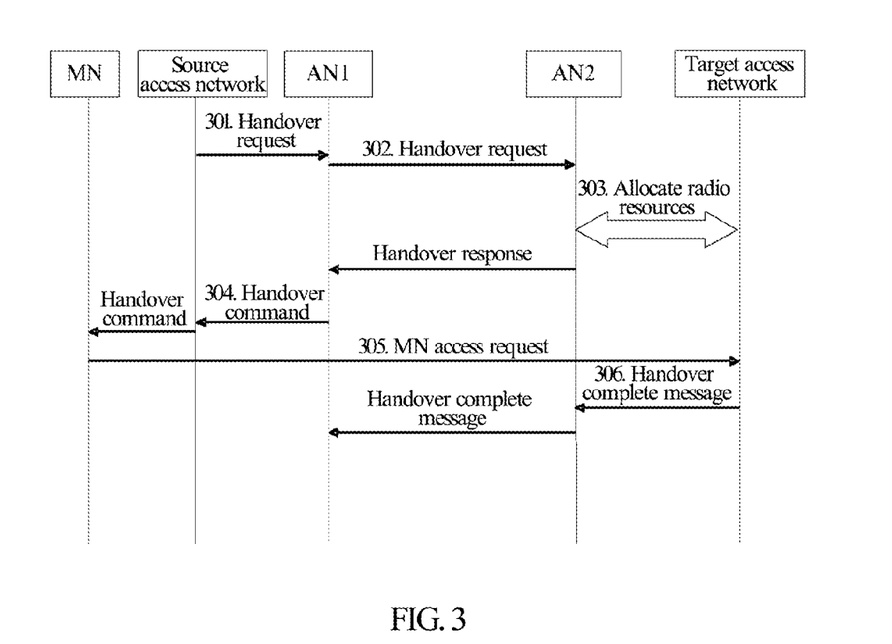
FIG. 3 is a schematic flowchart of a handover according to the embodiments of the present invention.

As shown in FIG. 3, the procedure of the handover of the mobile node in this embodiment during the movement mainly includes the following steps:

Step 301: the source access network which the MN currently accesses initiates a handover request toward the AN1 at the handover-out side, carrying the identification information about the target access network and user terminal, such as the AID of the MN;

Step 302: after having received handover request message, the AN1 finds the AN2 at the handover-in side according to the information about the target access network, and sends handover request message to AN2, carrying the identification information about MN;

AN1 can find AN2 according to the configured corresponding relationship about the target access network and AN2.

Step 303: after having received the handover request message, AN2 interacts with the target access network, allocates radio resources to the MN, and sends handover response message to AN1;

Step 304: after having received the handover response message sent from AN2, AN1 establishes a data forwarding relationship with AN2 and sends a handover command to the MN via the source access network;

Step 305: after having received the handover command, the MN initiates an access request toward the target access network; and Step 306: after having received the access request of the MN and completed the access processing of the MN, the target access network sends handover complete message to the AN2, and AN2 establishes a connection to the MN and sends the handover complete message to AN1.

By then, the MN completes the handover from AN1 to AN2.

Furthermore, during the above handover procedure, after having receive the handover request of AN1 in step 303, AN2 will also allocate a new RID to this MN, the mapping information about the AID of the MN and this new RID will be established in AN2, a request for updating the mapping information will be initiated toward the home ILR of the MN to update the AID-RID mapping information about the MN stored by the ILR.

Figure 4:
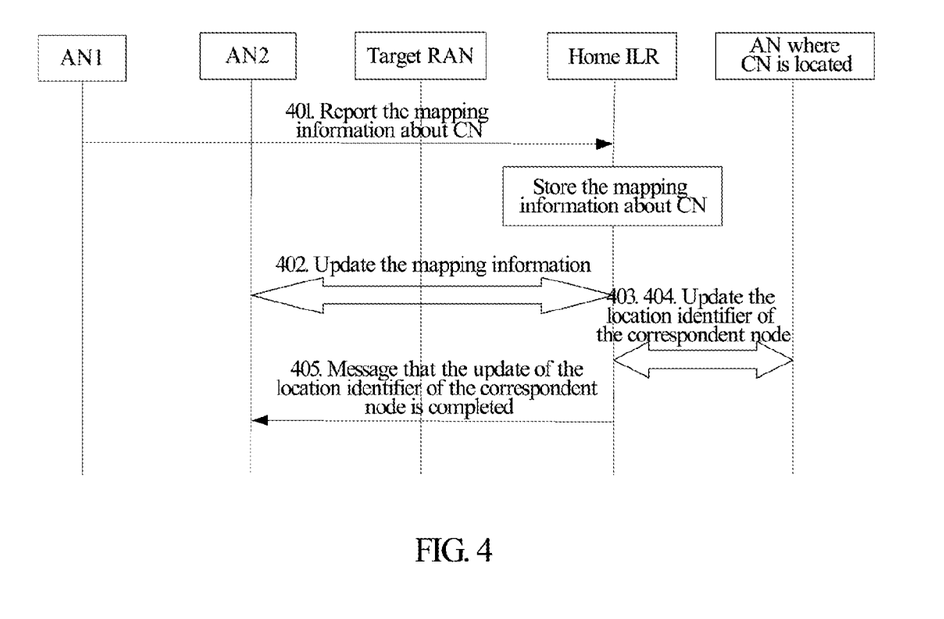
FIG. 4 is a schematic flowchart of notifying the AN which the CN accesses of the new location identifier/mapping information about the MN according to the embodiments of the present invention.

The handover management method in this embodiment further includes a relevant processing procedure of the home ILR of the MN notifying the AN which the correspondent node accesses of the new RID of the MN, as shown in FIG. 4, it includes the following steps:

Step 401: after having sent a handover request and received a handover response of AN2, if there is still information not reported to the home ILR of the MN in the AID-RID mapping information about the correspondent node of the MN locally stored, then AN1 will report the information which is not reported to the home ILR of the MN, and this ILR will store the received AID-RID mapping information;

Step 402: after having received a request for updating the mapping information about the MN sent from AN2, the home ILR of the MN updates the locally stored AID-RID mapping information about the MN;

Optionally, as a replacement procedure of the procedure of updating the mapping information about AN2 and the home ILR of the MN, AN1 can also initiate a procedure of updating the mapping information about itself and the home ILR of the MN. For example, after having obtained the new RID of the MN from AN2, AN1 will initiate a procedure of updating the mapping information toward the home ILR of the MN to notify the home ILR of the MN to update the mapping information record of the MN.

Step 403: the home ILR sends a notification of updating the location identifier of the correspondent node (i.e. MN) to each AN which the correspondent node of the MN accesses respectively, carrying the AID and new RID of the MN;

in this step, the home ILR can directly carry the new AID-RID mapping information about the MN to notify the AN which the correspondent node of the MN accesses to update the mapping information about the MN.

Step 404: after having received the notification of updating the location identifier of the MN, the AN which the correspondent node accesses updates the AID-RID mapping information about the MN and returns a response to the home ILR;

before the AN which the correspondent node accesses completes the update of the AID-RID mapping information about the local MN, the AID-RID mapping information about the correspondent node of the MN on AN1 may also be updated, for example, receiving the notification of updating the location identifier of the correspondent node, adding a new correspondent node, etc. When there is an update in the AID-RID mapping information about the correspondent node of MN, AN1 shall report the home ILR of the MN in real time. After having received the above report, the home ILR updates the stored mapping information about the correspondent node, if a notification of updating the mapping information about the MN has already been sent to the AN which this correspondent node previously accesses, then a notification of updating the location identifier of the MN needs to be sent to the AN which this correspondent node newly accesses again.

In addition, after AN1 has deleted the reported information about CN, when the mapping information about CN changes, since the home ILR of CN stores the AID-RID mapping information about the MN which is communicating with the CN, it can be reported to the home ILR of the MN according to the following manners:

Method I: when there is an update in the AID-RID mapping information about CN, the home ILR of CN sends a notification of updating the location identifier of the correspondent node to the ASN which the MN accesses, carrying the AID-RID mapping information about MN and the AID-RID mapping information about CN, thus the ASN which the MN accesses will find the corresponding home ILR of MN according to the AID-RID mapping information about MN so as to notify the home ILR of MN to update the AID-RID mapping information about the correspondent node CN.

Method II: when there is an update in the AID-RID mapping information about CN, the home ILR of CN notifies the ASN which the MN accesses of the new mapping information about CN, and at the same time, the home ILR of CN notifies the home ILR of MN to update the AID-RID information about CN according to the stored AID-RID mapping information about MN.

After having updated the AID-RID mapping information about MN, the AN which the correspondent node accesses will subsequently forward the data message sent from CN to MN to AN2 according to this mapping information.

Step 405: the home ILR sends the message that the update of the location identifier of the correspondent node is completed to the target access network.

The home ILR will be according to the response returned by the AN which the CN accesses, if it is a failure response, then the home ILR has to initiate a notification again until a success response is received from all the ANs which the CN accesses, or after a predetermined time is expired (if this predetermined time is expired, then it is deemed that the communication link is abnormal), it sends the message that the update of the location identifier of the correspondent node is completed to AN2;

After having received this message that the update of the location identifier of the correspondent node is completed, AN2 sends handover complete message to AN1 after having confirmed that a connection has been established with MN and the mapping information about the correspondent node of MN is acquired.

It can be seen from the above procedure that, AN2 needs not to notify all the ANs which the CN accesses of the new RID or AID-RID mapping information about MN, instead, this will be done by the home ILR. As such, the centralized signaling problem caused by notifying the AN which the CN accesses by AN2 one by one during a handover is relieved. It is not only suitable for the handover occasion, ILR can be used to carry out the notifying when it needs to notify the AN which the CN accesses when the RIDs of other MNs change.

In addition, the handover management method of this embodiment further includes a forwarding processing procedure of the data message between MN and CN during a handover. Hereinafter, the forwarding processing of the data message sent from MN to CN and sent from CN to MN during a handover will be described in conjunction with the accompanying drawings and particular examples respectively.

Figure 5:
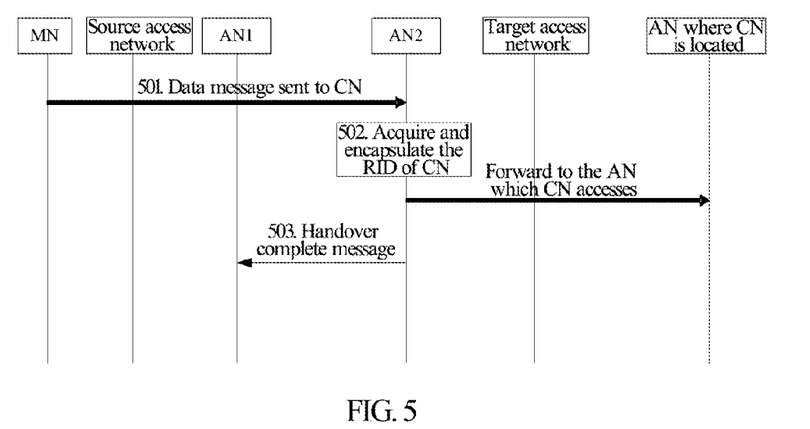
FIG. 5 is a schematic flowchart of forwarding the data message sent by the MN to the CN after the MN carries out the handover according to the embodiments of the present invention.

Referring to FIGS. 3 and 5, after the MN has accesses AN2, the forwarding processing procedure of the data message sent from MN to CN by AN2 is as follows:

Step 501: when receiving the data message sent from MN to CN, AN2 acquires the RID of CN according to the AID of the CN in the data message;

in this step, AN2 can acquire the RID of CN according to the following manners:

1. AN2 queries the AID-RID mapping information about CN locally according to the AID of the CN in the data message, wherein ASN2 may already store the AID-RID mapping information about CN locally via other terminals which it accesses and is communicating with the CN.

2. if AN2 fails to find the AID-RID mapping information about CN locally, then it queries the AID-RID mapping information about CN from the home ILR of CN to store locally.

3. if AN2 fails to find the AID-RID mapping information about CN locally, then it queries the AID-RID mapping information about CN from AN1 to store locally.

As to the received data message, AN2 can forward the data message to AN1 or the home PTF of CN when initiating mapping query toward AN1 or the home PTF of CN; or, after having acquired the mapping information about CN, AN2 forwards the data message to the AN which the CN accesses via a transmission network. After having received the data message sent from AN2, AN1 or the home PTF of CN queries the corresponding RID according to the AID of CN in the data message and encapsulates it in the data message, then forwards the data message to the AN which the CN accesses via a transmission network.

Step 502: after having acquired the AID-RID mapping information about CN, AN2 encapsulates the RID of CN in the received data message sent from MN to CN and sends the data message to the AN which the CN accesses via a transmission network.

Step 503: after having acquired the mapping information about CN, AN2 sends handover complete message to AN1.

In step 503, after having received the handover complete message sent by the target access network, AN2 can set a handover complete timer Tc, when the time of Tc is up, AN2 sends handover complete message to AN1. During Tc, AN2 acquires the AID-RID mapping information about the correspondent node.

By way of the above procedure, during a handover, AN1 need not send the communication relationship information (such as correspondent node list) about MN and the correspondent node to AN2, reducing the signaling load of the access node.

Figure 6:
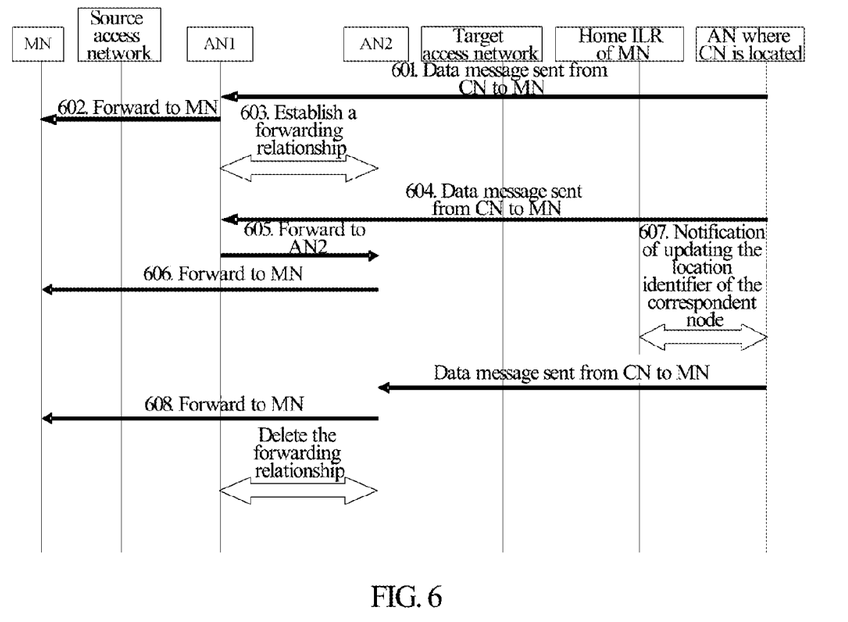
FIG. 6 is a schematic flowchart of forwarding the data message sent by the CN to the MN after and before the MN carries out the handover according to the embodiments of the present invention.

Referring to FIGS. 3 and 6, during the handover of MN, the forwarding processing procedure of the data message sent from MN to CN is as follows:

Step 601: before the handover, the data message sent from CN to MN is forwarded to AN1 which the MN accesses via a transmission network by way of the AN which the CN accesses;

Step 602: after having received the data message, AN1 forwards the data message to MN; Step 603: a handover occurs in MN, after having received handover response message sent from AN2, AN1 will establish a forwarding relationship with AN2;

Step 604: before the AN which the CN accesses updates the mapping information about MN, it still forwards the data message sent from CN to MN to AN1;

Step 605: after having received the data message, AN1 forwards the data message to AN2 by way of the forwarding relationship established between AN1 and AN2;

In particular, data forwarding can be carried out between AN1 and AN2 in the manner of tunnel encapsulation.

Step 606: after AN2 has established a connection with MN, it will sends the received data message to MN;

in addition, in step 605, AN1 can first buffer the received data message to be sent to MN and forwards the data message to AN2 when any set time is up or any event happens. For example, after having received the handover complete message sent by AN2, the message is forwarded to AN2.

Step 607: after having updated the stored mapping information about CN according to the notification of updating the mapping information about MN, the AN which the CN accesses, when receiving the data message sent from CN to MN, encapsulates the new RID of MN in the data message and sends the data message to AN2 via the transmission network;

Step 608: after having received the data message, AN2 sends the received data message to MN;

After having sent out handover complete message and having received the data message forwarded by AN1, AN2 deletes the forwarding relationship with AN1. After having received the handover complete message of AN2 and having forwarded the data message sent to MN, AN1 deletes the forwarding relationship with AN2 and deletes relevant information about MN; as to each correspondent node of MN, if this correspondent node does not communicate with other terminals which access AN1, then the mapping routing information about this correspondent node will be deleted.

The above several procedures include: AN2 queries the mapping information about CN when forwarding the data message to be sent to MN after the MN has handed over in; and the mapping information about CN is notified to the ILR, and the ILR notifies the AN which the CN accesses of the updated mapping information about MN and so on, they can be used respectively and not limited in one procedure.

The above embodiments are illustrated by taking an architecture based on separated identity identifier and location of the network as an example. The network architecture based by the technical solution of the present invention can be a Locator/ID Separation Protocol (LISP)+Alternative Logical Topology (ALT), or an integrated network. In this case, the Endpoint Identifier (EID) in LISP corresponds to AID, and the Routing Locator (RLOC) corresponds to RID. AN is equivalent to an integrated network access router, or a function complex of an Egress Tunnel Router (ETR) or Ingress Tunnel Router (ITR) in the LISP network architecture.

In addition, the embodiments of the present invention also provide an access node, applied in a network with separated identity identifier and location, comprising a terminal information reporting unit and a correspondent node information reporting unit, wherein the terminal information reporting unit is configured to: when a terminal accesses, allocate a new location identifier to the terminal and report the identity identifier and a new location identifier of the terminal to a home ILR of the terminal; and the correspondent node information reporting unit is configured to: when the terminal establishes a communication with a correspondent node, report the communication relationship information about the terminal and the correspondent node and the mapping information about the identity identifier and location identifier of the terminal to the home ILR of the terminal.

Furthermore, the correspondent node information reporting unit is further configured to: after having learnt that the mapping information about the correspondent node of the terminal has changed, report the changed mapping information to the ILR in real time; or report the changed mapping information about the correspondent node of the terminal to the ILR regularly; or after the number of the correspondent nodes of the terminal reaches a predetermined number, report the mapping information about the correspondent node of the terminal to the ILR, then report the changed mapping information about the correspondent node of the terminal in real time or regularly.

Furthermore, the correspondent node information reporting unit is configured to: delete the reported communication relationship information about the terminal and the correspondent node.

Furthermore, the correspondent node information reporting unit is further configured to: when the terminal carries out a handover, if there is still mapping information not reported to the ILR in the mapping information about the correspondent node of the terminal locally stored by the access node, then report the not reported mapping information to the ILR.

The embodiments of the present invention also provide an identity location register, applied in a network with separated identity identifier and location, comprising an information storage unit and a location identifier update unit, wherein the information storage unit is configured to: receive the mapping information about the identity identifier and location identifier of the correspondent node of the terminal reported by the access node and the mapping information about the correspondent node of the terminal to store locally; and the location identifier update unit is configured to: after having acquired the new location identifier of the terminal, update the location identifier in the locally stored mapping information about the terminal.

Furthermore, the location identifier update unit is further configured to: after having acquired a new location identifier of the terminal, send a notification of updating the location identifier of the terminal to one or more access nodes which the correspondent node accesses according to the locally stored mapping information about the correspondent node of the terminal, carrying the identity identifier and a new location identifier of the terminal.

Furthermore, the location identifier update unit is configured to: acquire the new location identifier of the terminal according to the following manner:

the terminal hands over from the first access node to a second access node, and after having allocated a new location identifier to the terminal, the second access node notifies the location identifier update unit to update the location identifier of the terminal, carrying the new location identifier to the terminal; and after having received the notification, the location identifier update unit acquires the new location identifier of the terminal.

Furthermore, the location identifier update unit is configured to: acquire the new location identifier of the terminal according to the following manner:

the terminal hands over from the first access node to a second access node, and after having allocated a new location identifier to the terminal, the second access node notifies the first access node;

after having received the new location identifier of the terminal, the first access node notifies the location identifier update unit to update the location identifier of the terminal, carrying the new location identifier of the terminal; and after having received the notification, the location identifier update unit acquires the new location identifier of the terminal.

The embodiments of the present invention also provide an access node, applied in a network with separated identity identifier and location, comprising a mapping information update unit and a forwarding unit, wherein the mapping information update unit is configured to: after having received the notification of updating the location identifier of the correspondent node or updating the mapping information about the correspondent node, update the location identifier in the locally stored mapping information about the identity identifier and location identifier of the correspondent node; and the forwarding unit is configured to: after having received data message sent from the correspondent node to the terminal during a handover, forward the data message to the access node which the correspondent node accesses according to the locally stored mapping information about the correspondent node.

The embodiments of the present invention also provide an access node, applied in a network with separated identity identifier and location, comprising a forwarding relationship unit and a data forwarding unit, wherein the forwarding relationship unit is configured to: after having sent a handover response to a source access node where a terminal hands over out or having received a handover response sent by a target access node at the handover-in side of the terminal, establish a forwarding relationship with the source access node or the target access node; and the data forwarding unit is configured to: after having received data message sent from the correspondent node to the terminal during a handover, forward the data message to the target access node via the forwarding relationship; or, after having received data message forwarded by the source access node of the terminal, forward the received data message to the terminal.

Furthermore, the data forwarding unit is configured to: after having received data message sent from the correspondent node to the terminal, forward the received data message to the target access node in real time; or, buffer the received data message sent from the correspondent node to the terminal, and after having received handover complete message sent from the target access node, send the buffered data message to the target access node according to the established forwarding relationship.

Furthermore, the forwarding relationship unit is further configured to: after having sent handover complete message to the source access node and having received the data message forwarded by the source access node, delete the forwarding relationship; or, after having received handover complete message sent from the target access node and forwarded the received data message sent from the correspondent node to the terminal, delete the forwarding relationship.

In summary, the present invention has the following features:

the access node reports the information about CN of MN to the home ILR in real time or in batch and select to delete part of or all of the reported information about CN from the correspondent node list of the MN according to a specified strategy, thus greatly solving the problem that the correspondent node list in the AN is too large and thus occupies memory and processing performance.

By way of the procedure of reporting the information about the correspondent node, the home ILR of MN stores the AID-RID mapping information about all the CNs communicating with the MN; when the location identifier of the MN is updated, the home ILR can notify the AN which the CN accesses one by one, solving the problem that the AN signaling load is too heavy at the handover-in side;

in addition, by way of promptly notifying the AN which the CN accesses of the new RID allocated by MN, the AID-RID mapping information about MN stored thereby can be ensured as being real-time and valid, the data message sent by CN can be routed to the AN at the handover-in side which the MN accesses after the latest RID is added and encapsulated;

the AN at the handover-in side can query the mapping routing information about CN by way of local query or toward the home ILR of CN or the AN at the handover-out side, therefore, during the handover, the AN at the handover-out side does not need to transfer the correspondent node list to the AN at the handover-in side, avoiding the occurrence of signaling burst during the handover;

in addition, by way of the forwarding relationship established between the AN at the handover-out side and the AN at the handover-in side, the data message forwarding and processing problem during a handover is solved, avoiding message discard during the handover and so on.

INDUSTRIAL APPLICABILITY

A simplified handover management procedure is proposed in combination with the features of the mobile communication network, an optimized method for managing user data in the handover management process is proposed, the function distribution and main procedure during the handover management process are clarified, and a mobility handover management is achieved under the framework based separated identity identifier and location of the network; and the signaling processing load of the access node is effectively reduced during the handover, which makes the function distribution of various network elements during the handover more rational.

What we claim is:

1. An information notification method, comprising:
   in a network that (a) separates the dual functions of an Internet Protocol (IP) address for identifying identity and location and that (b) uses an access identifier (AID) as an identity identifier and a routing-location identifier (RID) as a location identifier, wherein the AID is a unique identity allocated to each user terminal in the network, used in an access layer, and kept unchanged during movement of the user terminal to which the AID is allocated, and wherein the RID is allocated by a first access node (AN) to a terminal and is used for routing to the AN according to the RID,
   the terminal establishing a communication with a correspondent node,
   the first access node which the terminal accesses reporting to a home identity location register (ILR) of the terminal mapping information about the identity identifier and the location identifier of the correspondent node of the terminal, that is, AID-RID mapping information of the correspondent node of the terminal,
   the ILR storing the AID-RID mapping information of the correspondent node of the terminal; and
   after having acquired a new location identifier of the terminal, that is, a new RID of the terminal, the ILR, instead of a second access node which allocated the new RID to the terminal, sending a notification of updating the location identifier of the terminal to one or more access nodes which the correspondent node accesses according to the stored AID-RID mapping information of the correspondent node of the terminal, wherein the notification sent by the ILR to the one or more access nodes carries the identity identifier and the new location identifier of the terminal, that is, the AID and the new RID of the terminal.

2. The method as claimed in claim 1, wherein
   the ILR acquires the new location identifier of the terminal according to the following manner: the terminal hands over from the first access node to the second access node, the second access node notifies the ILR to update the location identifier of the terminal after having allocated the new location identifier to the terminal by using a notification carrying the new location identifier of the terminal; and after having received the notification from the second access node, the ILR acquires the new location identifier of the terminal.

3. The method as claimed in claim 1, wherein
   the ILR acquires the new location identifier of the terminal according to the following manner: the terminal hands over from the first access node to the second access node, the second access node notifies the first access node after having allocated the new location identifier to the terminal; and
   after having received the new location identifier of the terminal, the first access node notifies the ILR to update the location identifier of the terminal by using a notification carrying the new location identifier of the terminal; and after having received the notification of the first access node, the ILR acquires the new location identifier of the terminal.

4. The method as claimed in claim 1, further comprising:
   after having learnt that the AID-RID mapping information of the correspondent node of the terminal has changed, the first access node reporting the changed AID-RID mapping information of the correspondent node of the terminal to the ILR in real time; or
   the first access node reporting the changed AID-RID mapping information of the correspondent node of the terminal to the ILR regularly; or
   after a number of correspondent nodes of the terminal reaches a predetermined number, the first access node reporting the AID-RID mapping information of the correspondent node of the terminal to the ILR, then reporting the changed AID-RID mapping information of the correspondent node of the terminal in real time or regularly.

5. The method as claimed in claim 1, further comprising:
   after having received a handover request sent from a current access network of the terminal, the first access node starting the handover, if there is still mapping information which is not reported to the ILR in the AID-RID mapping information of the correspondent node of the terminal locally stored by the first access node, then reporting the mapping information which is not reported to the ILR to the ILR, and the ILR storing the received mapping information.

6. The method as claimed in claim 5, wherein
   after the first access node starts the handover and reports the mapping information which is not reported, the method further comprises:
   if there is an update in the locally stored AID-RID mapping information of the correspondent node of the terminal, reporting the updated AID-RID mapping information of the correspondent node of the terminal to the ILR in real time, and the ILR updating the stored AID-RID mapping information of the correspondent node of the terminal; and, if the ILR has sent a notification of updating the location identifier of the terminal to the access node which the correspondent node accessed originally, then the ILR sending a notification of updating the location identifier of the terminal to the access node which the correspondent node newly accesses again.

7. The method as claimed in claim 6, wherein
the first access node learns that there is an update in the AID-RID mapping information of the correspondent node of the terminal according to a received notification of updating the AID-RID mapping information of the correspondent node of the terminal sent by the home ILR of the correspondent node, and the notification of updating the AID-RID mapping information of the correspondent node of the terminal carries the identity identifier of the terminal and the AID-RID mapping information of the correspondent node of the terminal; and
the method further comprises: after having deleted locally reported communication relationship information about the terminal and the correspondent node, the first access node reporting the updated AID-RID mapping information of the correspondent node of the terminal to the ILR according to the identity identifier of the terminal in the notification of updating the AID-RID mapping information of the correspondent node of the terminal.

8. An information reporting method, comprising:
in a network that (a) separates the dual functions of an Internet Protocol (IP) address for identifying identity and location and that (b) uses an access identifier (AID) as an identity identifier and a routing-location identifier (RID) as a location identifier, wherein the AID is a unique identity allocated to each user terminal in the network, used in an access layer, and kept unchanged during movement of the user terminal to which the AID is allocated, and wherein the RID is allocated by an access node (AN) to a terminal and is used for routing to the AN according to the RID,
the terminal establishing a communication with a correspondent node via access nodes which the terminal and the correspondent node access respectively,
the access node which the terminal accesses reporting communication relationship information about the terminal and the correspondent node and mapping information about an identity identifier and the location identifier of the correspondent node, that is, AID-RID mapping information of the correspondent node, to a home identity location register (ILR) of the terminal;
the home ILR of the terminal storing the received communication relationship information and the AID-RID mapping information of the correspondent node and returning a success response; and
after the terminal has received the success response, the access node which the terminal accesses deleting the reported communication relationship information about the terminal and the correspondent node;
wherein after having acquired a new location identifier of the terminal, that is, a new RID of the terminal, the ILR instead of an access node which allocated the new RID to the terminal, sends a notification of updating the location identifier of the terminal to one or more access nodes which the correspondent node accesses according to the stored AID-RID mapping information of the correspondent node, wherein the notification sent by the ILR to the access nodes carries the identity identifier and a new location identifier of the terminal, that is, the AID and the new RID of the terminal.

9. The method as claimed in claim 8, further comprising:
after having learnt that the AID-RID mapping information of the correspondent node has changed, the access node which the terminal accesses reporting the changed AID-RID mapping information of the correspondent node to the ILR in real time; or
the access node which the terminal accesses reporting the changed AID-RID mapping information of the correspondent node to the ILR regularly; or
after a number of correspondent nodes of the terminal reaches a predetermined number, the access node which the terminal accesses reporting the AID-RID mapping information of the correspondent node to the ILR, then reporting the changed AID-RID mapping information of the correspondent node in real time or regularly.

10. A handover method, applied in a network with separated identity identifier and location, comprising:
a terminal establishing a communication with a correspondent node, a first access node which the terminal accesses reporting to a home identity location register (ILR) of the terminal mapping information about the identity identifier and location identifier of the correspondent node of the terminal, and the ILR storing the mapping information about the correspondent node of the terminal;
after having received a handover request sent from a current access network of the terminal, the first access node starting the handover and initiating a handover request toward a second access node, if there is still mapping information which is not reported to the ILR in the mapping information about the correspondent node of the terminal locally stored by the first access node, then reporting the mapping information which is not reported to the ILR to the ILR, and the ILR storing the received mapping information; and
after having received the handover request, the second access node allocating a new location identifier to the terminal and notifying the ILR to update the location identifier of the terminal, carrying the new location identifier of the terminal; and after having received the notification of the second access node, the ILR acquiring the new location identifier of the terminal.

11. The method as claimed in claim 10, wherein
after the ILR has acquired the new location identifier of the terminal, the method further comprises: the ILR sending a notification of updating the location identifier of the terminal to one or more access nodes which the correspondent node accesses according to the stored mapping information about the correspondent node of the terminal, carrying the identity identifier and the new location identifier of the terminal;
after having received a success response returned by the access node which the correspondent node accesses, the ILR notifying the second access node that the update of the correspondent node is completed; and
after having received the notification of the ILR, the second access node sending handover complete message to the first access node after having determined to establish a connection with the terminal which hands over in and acquired the mapping information about the correspondent node of the terminal.

12. A method for forwarding data message during a handover, comprising:
in a network that (a) separates the dual functions of an Internet Protocol (IP) address for identifying identity and location and that (b) uses an access identifier (AID) as an identity identifier and a routing-location identifier (RID) as a location identifier, wherein the AID is a unique identity allocated to each user terminal in the network, is used in an access layer, and kept unchanged during movement of the user terminal to which the AID is allocated, and wherein the RID is allocated by an access node (AN) to a terminal and is used for routing to the AN according to the RID, the terminal establishing a communication with a correspondent node, an access node which the terminal accesses reporting to a home identity location register (ILR) of the terminal mapping information about the identity identifier and the location identifier of the correspondent node of the terminal, that is, AID-RID mapping information of the correspondent node of the terminal, the ILR storing the mapping information about the identity identifier and the location identifier of the correspondent node of the terminal, wherein the location identifier of the correspondent node is allocated by an access node the correspondent node accesses and is encapsulated in a data message to be routed to the access node the correspondent node accesses;

after having updated mapping information about the terminal, that is, updated AID-RID mapping information of the terminal, the ILR, instead of a second access node at a handover-in side of the terminal, sending a notification of updating the mapping information about the terminal to one or more access nodes which the correspondent node accesses according to the stored AID-RID mapping information of the correspondent node of the terminal, wherein the notification sent by the ILR to the access nodes carries the updated AID-RID mapping information of the terminal; and after having received the updated AID-RID mapping information of the terminal, the access node which the correspondent node accesses, when receiving a data message sent from the correspondent node to the terminal, sending the data message to the second access node at the handover-in side of the terminal according to an updated location identifier of the terminal, that is, an updated RID of the terminal.

13. The method as claimed in claim 12, wherein the ILR updates the AID-RID mapping information of the terminal according to the following manner: the terminal hands over from a first access node to the second access node, the second access node notifies the ILR to update the location identifier of the terminal after having allocated a new location identifier to the terminal by using a notification carrying the new location identifier of the terminal; and after having received the notification of the second access node, the ILR updates the stored AID-RID mapping information of the terminal according to the new location identifier of the terminal.

14. The method as claimed in claim 12, wherein the ILR updates the AID-RID mapping information of the terminal according to the following manner: the terminal hands over from a first access node to the second access node, and the second access node notifies the first access node after having allocated a new location identifier to the terminal; and after having received the new location identifier of the terminal, the first access node notifies the ILR to update the location identifier of the terminal by using a notification carrying the new location identifier of the terminal; and the ILR updates the stored mapping information about the terminal according to the new location identifier of the terminal.

15. The method as claimed in claim 12, wherein the first access node at a handover-out side of the terminal establishes a forwarding relationship with the second access node during the handover;

before the access node which the correspondent node accesses receives the updated AID-RID mapping information of the terminal, the method further comprises:

when receiving data message sent from the correspondent node to the terminal, sending the data message to the first access node according to the locally stored original location identifier of the terminal; and after having received the data message, the first access node forwarding the data message to the second access node according to the established forwarding relationship.

16. The method as claimed in claim 15, wherein after having received a handover response of the second access node, the first access node establishes the forwarding relationship with the second access node; and the method further comprises: after having sent handover complete message and having received the data message forwarded by the first access node, the second access node deleting the forwarding relationship.

17. The method as claimed in claim 16, wherein after the first access node has received the data message sent to the terminal, the method further comprises:

the first access node forwarding the received data message to the second access node according to the established forwarding relationship in real time; or after having buffered the data message sent to the terminal and having received the handover complete message, the first access node sending the buffered data message to the second access node and deleting the forwarding relationship after having forwarded the buffered data message.

18. The method as claimed in claim 1, further comprising:

the terminal establishing an end-to-end communication with the correspondent node via access nodes which the terminal and the correspondent node access respectively, and the access node storing mapping information about the identity identifier and location identifier of the terminal;

the terminal carrying out the handover, a second access node at a handover-in side allocating a new location identifier to the terminal and establishing a forwarding relationship with a first access node at a handover-out side of the terminal during the handover;

before learning the new location identifier of the terminal, the access node which the correspondent node accesses, when receiving data message sent from the correspondent node to the terminal, sending the data message to the first access node according to the locally stored original location identifier of the terminal; and after having received the data message, the first access node forwarding the data message to the second access node according to the established forwarding relationship.

19. The method as claimed in claim 18, wherein after having received a handover response of the second access node, the first access node establishes the forwarding relationship with the second access node; and the method further comprises: after having sent handover complete message to the first access node and having received the data message forwarded by the first access node, the second access node deleting the forwarding relationship.

20. The method as claimed in claim 19, wherein
the step of after having received the data message sent to the terminal, the first access node forwarding the data message to the second access node according to the established forwarding relationship comprises:
forwarding the data message to the second access node in real time; or
buffering the received data message sent to the terminal, and after having received the handover complete message, sending the buffered data message to the second access node and deleting the forwarding relationship after having forwarded the buffered data message.

21. An access node, comprising a terminal information reporting unit and a correspondent node information reporting unit, wherein
the access node is located in a network that (a) separates the dual functions of an Internet Protocol (IP) address for identifying identity and location and that (b) uses an access identifier (AID) as an identity identifier and a routing-location identifier (RID) as a location identifier, wherein the AID is a unique identity allocated to each user terminal in the network, is used in an access layer, and is kept unchanged during movement of the user terminal, and wherein the RID is allocated by an access node (AN) to a terminal and is used for routing to this AN according to this RID;
the terminal information reporting unit is configured to: when a terminal accesses, allocate a new location identifier to the terminal and report the identity identifier and new location identifier of the terminal, that is, the AID and a new RID, to a home identity location register (ILR) of the terminal to be stored by the home ILR of the terminal; and
the correspondent node information reporting unit is configured to: when the terminal establishes a communication with a correspondent node, report communication relationship information about the terminal and the correspondent node and mapping information about the identity identifier and location identifier of the correspondent node, that is, the AID-RID mapping information of the correspondent node, to the home ILR of the terminal to be stored by the home ILR of the terminal;
wherein after having acquired a new location identifier of the terminal, that is, a new RID of the terminal, the ILR instead of an access node which allocated the new RID to the terminal, sends a notification of updating the location identifier of the terminal to one or more access nodes which the correspondent node accesses according to the stored AID-RID mapping information of the correspondent node of the terminal, the notification sent by the ILR to the access nodes carrying the identity identifier and a new location identifier of the terminal, that is, the AID and the new RID of the terminal.

22. The access node as claimed in claim 21, wherein
the correspondent node information reporting unit is further configured to: after having learnt that the AID-RID mapping information of the correspondent node of the terminal has changed, report the changed AID-RID mapping information of the correspondent node of the terminal to the ILR in real time; or
report the changed AID-RID mapping information of the correspondent node of the terminal to the ILR regularly; or
after a number of correspondent nodes of the terminal reaches a predetermined number, report the AID-RID mapping information of the correspondent node of the terminal to the ILR, then report the changed AID-RID mapping information of the correspondent node of the terminal in real time or regularly.

23. The access node as claimed in claim 21, wherein
the correspondent node information reporting unit is configured to: delete the reported communication relationship information about the terminal and the correspondent node.

24. The access node as claimed in claim 21, wherein
the correspondent node information reporting unit is further configured to: when the terminal carries out a handover, if there is still mapping information which is not reported to the ILR in the AID-RID mapping information of the correspondent node of the terminal locally stored by the access node, then report the mapping information which is not reported to the ILR to the ILR.

25. An identity location register, comprising an information storage unit and a location identifier update unit, wherein
the identity location register is located in a network that (a) separates the dual functions of an Internet Protocol (IP) address for identifying identity and location and that (b) uses an access identifier (AID) as an identity identifier and a routing-location identifier (RID) as a location identifier, wherein the AID is a unique identity allocated to each user terminal in the network, is used in an access layer, and is kept unchanged during movement of the user terminal to which the AID is allocated, and wherein the RID is allocated by an access node (AN) to a terminal and is used for routing to the AN according to the RID;
the information storage unit is configured to: receive mapping information about the identity identifier and location identifier of a correspondent node of a terminal, that is, the AID-RID mapping information of a correspondent node of a terminal, reported by an access node and mapping information about the correspondent node of the terminal to store locally; and
the location identifier update unit is configured to: after having acquired a new location identifier of the terminal, update the location identifier in the locally stored mapping information about the correspondent node of the terminal;
wherein the location identifier update unit is further configured to: after having acquired a new location identifier of the terminal, that is, a new RID of the terminal, send a notification of updating the location identifier of the terminal to one or more access nodes which the correspondent node accesses according to the locally stored AID-RID mapping information of the correspondent node of the terminal, the notification carrying the identity identifier and new location identifier of the terminal, that is, the AID and the new RID of the terminal.

26. The identity location register as claimed in claim 25, wherein
the location identifier update unit is configured to: acquire the new location identifier of the terminal according to the following manner: after having received a notification of a second access node, acquire the new location identifier of the terminal; and
the notification of the second access node is that the terminal hands over from the first access node to a second access node, and after having allocated a new location identifier to the terminal, the second access node sends the notification to the location identifier update unit, carrying the new location identifier of the terminal.

27. The identity location register as claimed in claim 25, wherein
the location identifier update unit is configured to: acquire the new location identifier of the terminal according to the following manner: after having received a notification of a first access node, acquire the new location identifier of the terminal;
the notification of the first access node is that the terminal hands over from the first access node to a second access node, and after having allocated a new location identifier to the terminal, the second access node notifies the first access node; and
after having received the new location identifier of the terminal, the first access node sends the notification to the location identifier update unit, carrying the new location identifier of the terminal.

28. The access node as claimed in claim 21, further comprising a mapping information update unit and a forwarding unit, wherein
the mapping information update unit is configured to: after having received a notification of updating a location identifier of a correspondent node or updating AID-RID mapping information of the correspondent node of the terminal, update the location identifier in locally stored mapping information about the identity identifier and the location identifier of the correspondent node; and
the forwarding unit is configured to: when receiving data message sent from the correspondent node to a terminal, forward the data message to an access node which the correspondent node accesses according to the locally stored AID-RID mapping information of the correspondent node of the terminal.

29. The access node as claimed in claim 21, further comprising a forwarding relationship unit and a data forwarding unit, wherein
the forwarding relationship unit is configured to: after having sent a handover response to a source access node from which a terminal hands over or having received a handover response sent by a target access node to which the terminal hands over, establish a forwarding relationship with the source access node or the target access node; and
the data forwarding unit is configured to: after having received data message sent from a correspondent node to the terminal during the handover, forward the received data message to the target access node via the forwarding relationship; or, after having received data message forwarded by the source access node of the terminal, forward the received data message to the terminal.

30. The access node as claimed in claim 29, wherein
the data forwarding unit is configured to: after having received the data message sent from the correspondent node to the terminal, forward the received data message to the target access node in real time; or, buffer the received data message sent from the correspondent node to the terminal, and after having received handover complete message sent from the target access node, send the buffered data message to the target access node according to the established forwarding relationship.

31. The access node as claimed in claim 29, wherein
the forwarding relationship unit is further configured to: after having sent handover complete message to the source access node and having received the data message forwarded by the source access node, delete the forwarding relationship; or, after having received handover complete message sent from the target access node and having forwarded the received data message sent from the correspondent node to the terminal, delete the forwarding relationship.

\* \* \* \* \*